United States Patent
Kitajima et al.

(10) Patent No.: US 9,547,317 B2
(45) Date of Patent: Jan. 17, 2017

(54) INFORMATION PROCESSING DEVICE, INFORMATION PROCESSING METHOD, AND STORAGE MEDIUM

(71) Applicant: FUJITSU LIMITED, Kawasaki-shi, Kanagawa (JP)

(72) Inventors: Hironobu Kitajima, Kawasaki (JP); Toshihiro Sonoda, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 652 days.

(21) Appl. No.: 14/033,760

(22) Filed: Sep. 23, 2013

(65) Prior Publication Data

US 2014/0163743 A1 Jun. 12, 2014

(30) Foreign Application Priority Data

Dec. 11, 2012 (JP) ................................ 2012-270400

(51) Int. Cl.
G06F 19/00 (2011.01)
G05D 23/19 (2006.01)

(52) U.S. Cl.
CPC .......... G05D 23/19 (2013.01); G05D 23/1923 (2013.01)

(58) Field of Classification Search
CPC ............ G05F 1/66; G05B 15/02; F24F 3/065; F24F 11/006; F24F 2011/0075
USPC ........................................ 700/274, 275, 291
See application file for complete search history.

(56) References Cited

U.S. PATENT DOCUMENTS

| 2007/0100494 | A1* | 5/2007 | Patel | G06F 1/206 700/190 |
| 2009/0222139 | A1* | 9/2009 | Federspiel | F24F 11/006 700/278 |
| 2010/0076608 | A1* | 3/2010 | Nakajima | G05B 19/042 700/278 |
| 2011/0225998 | A1* | 9/2011 | Yamashita | F24F 3/065 62/126 |

FOREIGN PATENT DOCUMENTS

| JP | 10-309037 | 11/1998 |
| JP | 2934417 | 5/1999 |
| JP | 2934417 | 8/1999 |
| JP | 2000-78748 | 3/2000 |
| JP | 2003-204624 | 7/2003 |

* cited by examiner

Primary Examiner — Michael D Masinick
(74) Attorney, Agent, or Firm — Oblon, McClelland, Maier & Neustadt, L.L.P.

(57) ABSTRACT

An information processing device includes a memory; and a processor coupled to the memory and configured to obtain data including a temperature in a space where each of a plurality of air conditioning apparatuses is installed, a temperature outside the space, and power consumption of the plurality of air conditioning apparatuses, calculate a factor to obtain relationship between the temperature in the space, the temperature outside the space, and the power consumption related to each of the plurality of the air conditioning apparatuses based on the obtained data, and calculate, in a case of changing a setting temperature of the plurality of air conditioning apparatuses, a change width of each of the setting temperatures of the plurality of air conditioning apparatuses in such a manner that variation in the change width becomes a control unit using an objective function expressing a cost of a power supplier and the calculated factor.

19 Claims, 11 Drawing Sheets

FIG. 5

| VARIABLE NAME | NUMERICAL VALUE |
|---|---|
| $PD$ | 20 [YEN/kwh] |
| $CP_i$ | 10 [YEN/kwh] |
| $CD$ | 20 [YEN/kwh] |
| $P_i$ | $P_1$=15 [kw], $P_2$=5 [kw] |
| $\sum_j D_{j,T}$ | 21.2 [kwh] |

FIG. 7

| | 70a | | |
|---|---|---|---|
| AIR CONDITIONING APPARATUS | | | |
| TIME AND DATE | SETTING TEMPERATURE $T_{in}$ | AIR TEMPERATURE $T_{out}$ | POWER CONSUMPTION E |
| 2012/8/15 10:00 | 26 | 30 | 540 |
| 2012/8/15 11:00 | 26 | 31 | 560 |
| ⋮ | ⋮ | ⋮ | ⋮ |

FIG. 8

|  |  | $A_j$ | $B_j$ | $C_j$ |
|---|---|---|---|---|
| AIR CONDITIONING APPARATUS ID | 1 | $\alpha_0$ | $\alpha_1$ | $\alpha_2$ |
|  | 2 | $\beta_0$ | $\beta_1$ | $\beta_2$ |
|  | ⋮ | ⋮ | ⋮ | ⋮ |

FIG. 9

| VARIABLE NAME | NUMERICAL VALUE |
|---|---|
| $A_j$ | $A_1=-0.09$, $A_2=-0.11$, $A_3=-0.08$, $A_4=-0.12$, $A_5=-0.07$, $A_6=-0.13$, $A_7=-0.10$, $A_8=-0.10$, $A_9=-0.10$, $A_{10}=-0.10$ |

FIG. 11

| VARIABLE NAME | NUMERICAL VALUE |
|---|---|
| $\Delta T^S_{j,t}$ | $\Delta T^S_{1,t}=1, \Delta T^S_{2,t}=1, \Delta T^S_{3,t}=2, \Delta T^S_{4,t}=2,$ $\Delta T^S_{5,t}=1, \Delta T^S_{6,t}=1, \Delta T^S_{7,t}=1, \Delta T^S_{8,t}=1,$ $\Delta T^S_{9,t}=1, \Delta T^S_{10,t}=1$ |

US 9,547,317 B2

INFORMATION PROCESSING DEVICE, INFORMATION PROCESSING METHOD, AND STORAGE MEDIUM

CROSS-REFERENCE TO RELATED APPLICATION

This application is based upon and claims the benefit of priority of the prior Japanese Patent Application No. 2012-270400, filed on Dec. 11, 2012, the entire contents of which are incorporated herein by reference.

FIELD

The embodiments discussed herein are related to an information processing device, an information processing method, and a storage medium.

BACKGROUND

In power supply plans carried out by power companies in the past, a demand is normally handled as a predicted value (fixed value). Such a power supply plan is a plan to adjust the amount of power supply by running or stopping power generating facilities.

In recent years, as a method for controlling power consumption of a demander on the side of the power provider, demand response/demand side management (hereinafter, referred to as DR/DSM) has been started reviewing. DR/DSM is a method of achieving coordination of power supply and demand by monitoring the demand in the power grid on the side of the power provider and making a power control plan for each apparatus in accordance with the demand to suppress power consumption of each apparatus.

As such related art, there are disclosed, for example, Japanese Laid-open Patent Publication No. 2000-78748, Japanese Patent No. 2934417, and the like.

In a case that a power provider carries out DR/DSM, the power provider is capable of controlling the power consumption by changing the value of setting temperature that affects power consumption of an air conditioning apparatus. In a case that setting temperatures of a plurality of air conditioning apparatuses is controlled by a power provider, it is preferred that load due to the control of the power consumption is not concentrated on a specific air conditioning apparatus.

SUMMARY

According to an aspect of the invention, an information processing device includes a memory; and a processor coupled to the memory and configured to obtain data including a temperature in a space where each of a plurality of air conditioning apparatuses is installed, a temperature outside the space, and power consumption of the plurality of air conditioning apparatuses, calculate a factor to obtain relationship between the temperature in the space, the temperature outside the space, and the power consumption related to each of the plurality of the air conditioning apparatuses based on the obtained data, and calculate, in a case of changing a setting temperature of the plurality of air conditioning apparatuses, a change width of each of the setting temperatures of the plurality of air conditioning apparatuses in such a manner that variation in the change width becomes a control unit using an objective function expressing a cost of a power supplier and the calculated factor.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is one example of numerical values of various variables used for information processing;

FIG. 7 is a diagram illustrating one example of obtained information database used for calculating the primary factor $A_j$;

FIG. 8 is a diagram illustrating one example of factor information database;

FIG. 9 is a diagram illustrating one example of numerical values of the primary factor $A_j$ that is calculated by a factor calculation unit;

FIG. 11 is a diagram illustrating one example of numerical values of a change width $\Delta T^S_{j,t}$ in setting temperatures of each demander that is calculated by a setting temperature calculation unit in the second embodiment.

DESCRIPTION OF EMBODIMENTS

An amount of power consumption of an air conditioning apparatus depends on characteristics (performance) of the air conditioning apparatus or an area of a room in which an air conditioning apparatus is installed. For example, an air conditioning apparatus having a low cooling capacity (or a heating capacity) takes a longer period of time until a temperature of an installation room reaches a setting temperature than an air conditioning apparatus having a high cooling capacity (or a heating capacity). Therefore, an air conditioning apparatus having a low cooling capacity (or a heating capacity) has greater power consumption than an air conditioning apparatus having a high cooling capacity (or a heating capacity). Even with an identical air conditioning apparatus, an air conditioning apparatus takes a longer period of time until the temperature of a room reaches a setting temperature when installed in a room having a greater area. Therefore, power consumption of an air conditioning apparatus becomes greater when installed in a room having a greater area.

The applicant has found that, in a case that a power provider carries out DR/DSM in order to control power consumption of each apparatus of a demander, the problem of greater variation in the change widths in power consumption among the apparatuses becomes apparent. Part of the reason is that a change width in setting temperatures of power consumption to be set for each air conditioning apparatus by a power provider becomes greater as the apparatus has greater power consumption.

According to the present embodiments, it is enabled not to concentrate the load due to the control of power consumption on a specific air conditioning apparatus by considering variation in change widths in the power consumption among apparatuses.

First Embodiment

Specific descriptions are given below to a first embodiment with reference to FIGS. 1 through 9.

Figure 1:
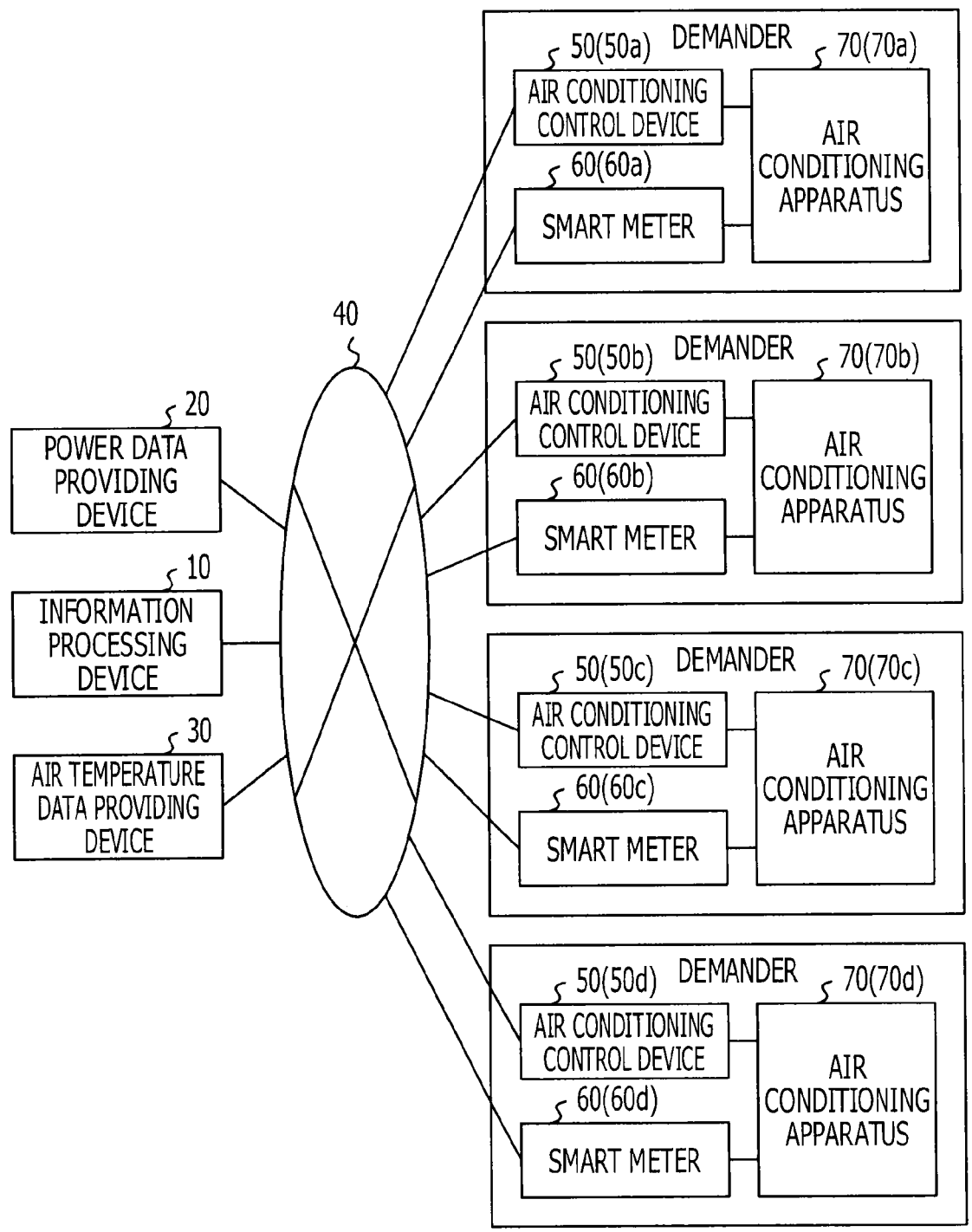
FIG. 1 is a diagram illustrating one example of an information processing system in a first embodiment.

FIG. 1 is a diagram illustrating one example of an information processing system in the first embodiment. FIG. 1 is an embodiment in a case that an apparatus subject to power consumption control is an air conditioning apparatus. As illustrated in FIG. 1, the information processing system includes an information processing device 10, a power data providing device 20, an air temperature data providing device 30, an air conditioning control device 50, a smart meter 60, and an air conditioning apparatus 70. The information processing device 10, the power data providing device 20, the air temperature data providing device 30, the air conditioning control device 50, and the smart meter 60 are communicatively connected to each other through a network 40, such as the Internet.

The information processing device 10 is a device to carry out power demand control that belongs to a power provider (power supplier). The information processing device 10 is a device that makes a power control plan based on various types of data and executes power control process for each demander based on the control plan thus made. The information processing device 10 is, for example, a server. A method of process that is executed by the information processing device 10 is described later.

The power data providing device 20 is a device to provide information on demand prediction for the air conditioning apparatus 70 of a demander to the information processing device 10 that belongs to the power provider.

The air temperature data providing device 30 is a device to be installed in an organization, a company, and the like that predict weather and air temperatures, such as Meteorological Agency and Weather Association, for example. The air temperature data providing device 30 sends data of air temperatures predicted at a point where a demander is present and its neighborhood to the information processing device 10. The air temperature data providing device 30 is, for example, a server.

The air conditioning control device 50 is a device to control a setting temperature of the air conditioning apparatus 70 that is installed in a building (home, office, factory, or the like) of a demander. The air conditioning control device 50 is also capable of receiving a control signal to instruct a setting temperature from the information processing device 10 to control the setting temperature of the air conditioning apparatus 70 based on the received control signal. FIG. 1 illustrates, as one example of the air conditioning control device 50, air conditioning control devices 50a, 50b, 50c, and 50d.

The smart meter 60 is a measuring apparatus to measure power consumption of the air conditioning control device 50. The smart meter 60 is electrically connected to the air conditioning control device 50. FIG. 1 illustrates, as one example of the smart meter 60, smart meters 60a, 60b, 60c, and 60d.

The air conditioning apparatus 70 is a device to control a temperature of a predetermined room to be installed in a building of a demander. The air conditioning apparatus 70 is, for example, an air conditioner. FIG. 1 illustrates, as one example of the air conditioning apparatus 70, air conditioning apparatuses 70a, 70b, 70c, and 70d.

A hardware configuration of the information processing device 10 is described below.

Figure 2:
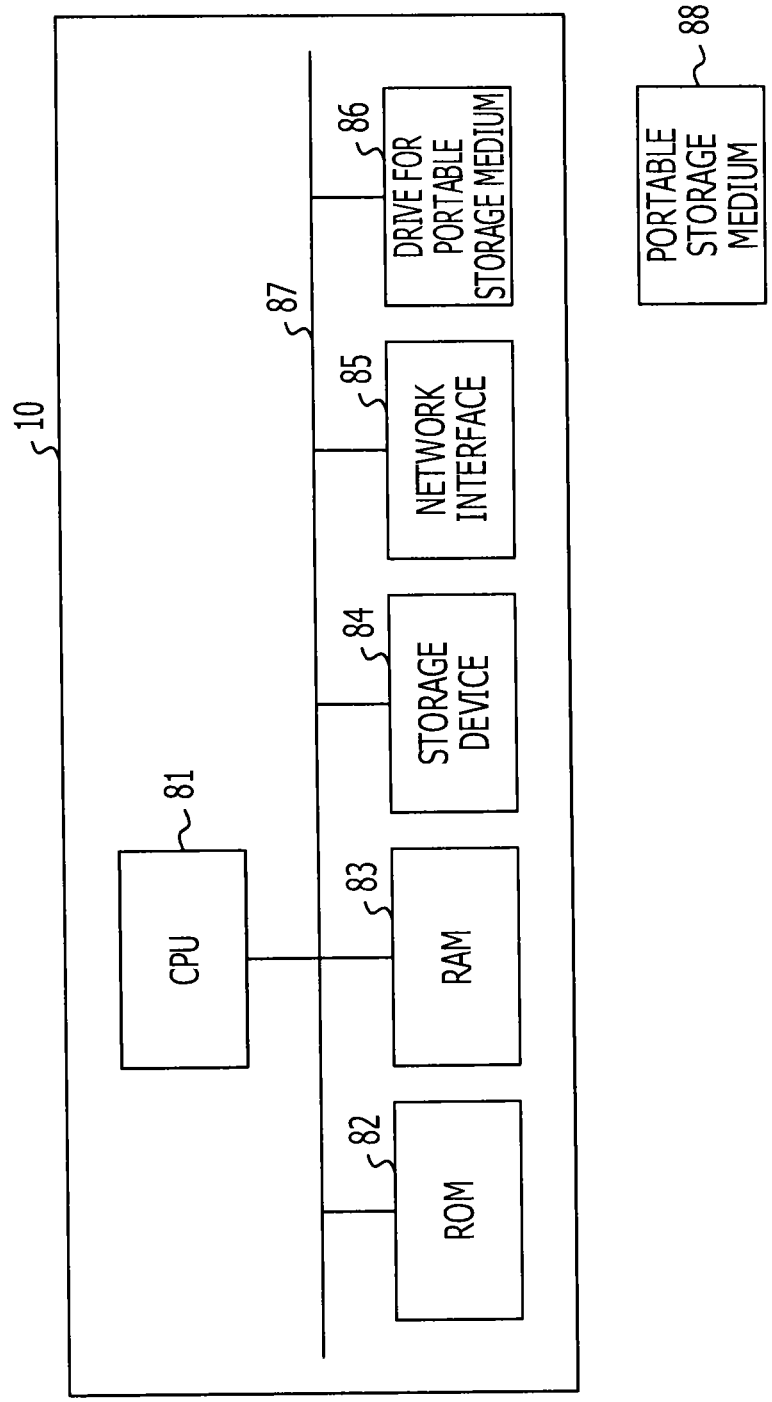
FIG. 2 is a diagram illustrating one example of a hardware configuration of an information processing device in the first embodiment.

FIG. 2 is a diagram illustrating one example of a hardware configuration of the information processing device 10 in the first embodiment. As illustrated in FIG. 2, the information processing device 10 includes a central processing unit (CPU) 81, a read only memory (ROM) 82, a random access memory (RAM) 83, a storage device 84, a network interface 85, a drive 86 for a portable storage medium, and the like.

Each component of the information processing device 10 is connected to a bus 87. The storage device 84 is, for example, a hard disk drive (HDD). In the information processing device 10, functions of the information processing device 10 are achieved by that a program (including an information processing program) stored in the ROM 82 or the storage device 84 or a program (including an information processing program) read from a portable storage medium 88 by the drive 86 for a portable storage medium is executed by a processor, such as the CPU 81, Functions of each component of the information processing device 10 is described below.

Figure 3:
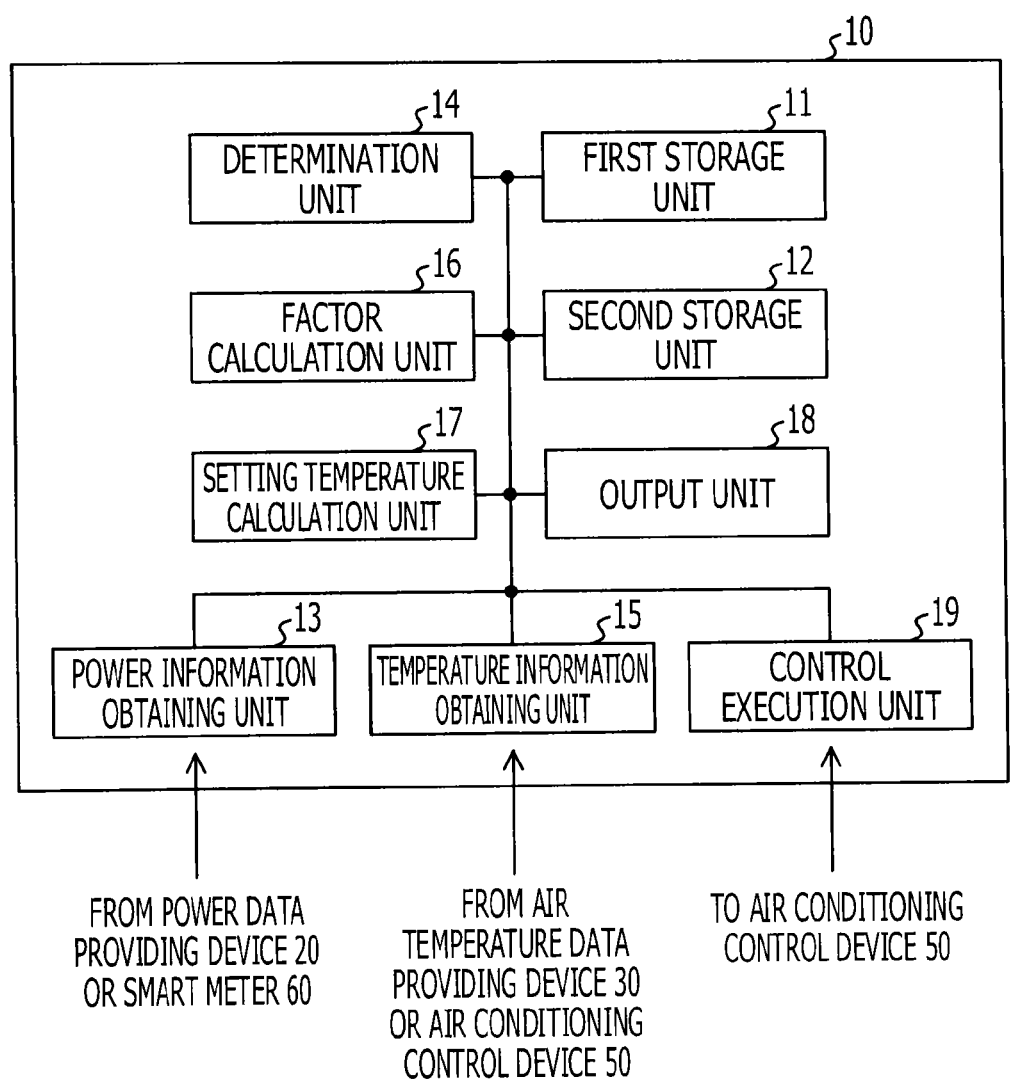
FIG. 3 is a diagram illustrating one example of a configuration of the information processing device in the first embodiment.

FIG. 3 is a diagram illustrating one example of a configuration of the information processing device 10 in the first embodiment. As illustrated in FIG. 3, the information processing device 10 includes a first storage unit 11, a second storage unit 12, a power information obtaining unit 13, a determination unit 14, a temperature information obtaining unit 15, a factor calculation unit 16, a setting temperature calculation unit 17, an output unit 18, and a control execution unit 19.

The first storage unit 11 corresponds to, for example, the ROM 82, the storage device 84, the drive 86 for a portable storage medium, or the portable storage medium 88 in FIG. 2. The first storage unit 11 is capable of storing an information processing program in order to make a power control plan.

The second storage unit 12 corresponds to, for example, the ROM 82, the RAM 83, the storage device 84, the drive 86 for a portable storage medium, or the portable storage medium 88 in FIG. 2. The second storage unit 12 is used as database (DB) to store various types of information used for process that is executed in the information processing device 10.

The power information obtaining unit 13 receives information on demand prediction of a demander and information on maximum power supply of a power provider from the power data providing device 20. Then, the power information obtaining unit 13 stores each item of the received information in the second storage unit 12. The maximum power supply is not a maximum amount of power that may be supplied by a power provider but has a value lower than the maximum amount set as an upper limit value. The power information obtaining unit 13 obtains information on power consumption data of the air conditioning apparatus 70 and the time of day (time and date) when obtained from each smart meter 60. Then, the power information obtaining unit 13 stores the obtained information in obtained information database in the second storage unit 12. The power information obtaining unit 13 is achieved by a processor, such as the CPU 81 in FIG. 2 or a micro processing unit (MPU), for example, and the network interface 85.

The determination unit 14 is capable of readout of the information processing program stored in the first storage unit 11 to execute each type of process of the information processing program. The determination unit 14 determines whether or not to make a plan including demand suppression by DR/DSM based on the information on demand prediction of a demander and the information on maximum power supply that may be supplied by a power generator that are stored in the second storage unit 12. The determination unit 14 is achieved by a processor, such as the CPU 81 in FIG. 2 or an MPU, for example.

The temperature information obtaining unit 15 receives data of air temperatures predicted at a point where a demander is present and its neighborhood from the air temperature data providing device 30. Then, the temperature information obtaining unit 15 stores each type of the received information in the second storage unit 12. The temperature information obtaining unit 15 is achieved by a processor, such as the CPU 81 in FIG. 2 or a micro processing unit (MPU), for example, and the network interface 85.

The factor calculation unit 16 calculates primary factors $A_j$, $B_j$, and $C_j$ for each air conditioning apparatus 70 when power consumption of the air conditioning apparatus 70 of a demander is expressed using a linear mode by assuming an ambient temperature and a setting temperature of the air conditioning apparatus 70 as parameters, based on the information stored in the second storage unit 12.

The setting temperature calculation unit 17 calculates, in a case that a predicted demand for power exceeds an upper limit of the power supply, a shortage of power to be supplied to the air conditioning apparatus 70 based on power information including the information on an upper limit amount of the total of power to be supplied to the air conditioning apparatus 70 and the information on a predicted demand for power to be consumed by the air conditioning apparatus 70 that are obtained by the power information obtaining unit 13. Then, the setting temperature calculation unit 17 calculates a real value of the change width in setting temperatures in such a manner that dispersion of the change width in setting variables for the air conditioning apparatus 70 dealing with the shortage of power based on the shortage of power to be supplied to the air conditioning apparatus 70 approaches the minimum. Here, the real value of the change width in setting temperatures is a common value regardless of the type of air conditioning apparatus 70. The setting temperature calculation unit 17 is achieved by a processor, such as the CPU 81 illustrated in FIG. 2 or an MPU, for example. Details of a processing method that is executed by the setting temperature calculation unit 17 are described later.

The output unit 18 is capable of outputting the setting temperature of the air conditioning apparatus 70 of each demander that is calculated by the setting temperature calculation unit 17 or the change width in the setting temperatures. The output unit 18 is, for example, a display device, such as a liquid crystal display, a plasma display, or an organic EL display.

The control execution unit 19 executes, when a power demand surpasses the maximum power supply of a power provider, control to suppress power consumption of the air conditioning apparatus 70 of each demander until reaching the maximum amount of power that may be supplied by the power provider. The control execution unit 19 sends an instruction signal for changing the setting temperature in the change width that is calculated by the setting temperature calculation unit 17 to the air conditioning control device 50 of each demander via the network 40. The control execution unit 19 is achieved by a processor, such as the CPU 81 in FIG. 2 or a micro processing unit (MPU), for example, and the network interface 85.

Next, an information processing method by the information processing device 10 is described.

Figure 4:
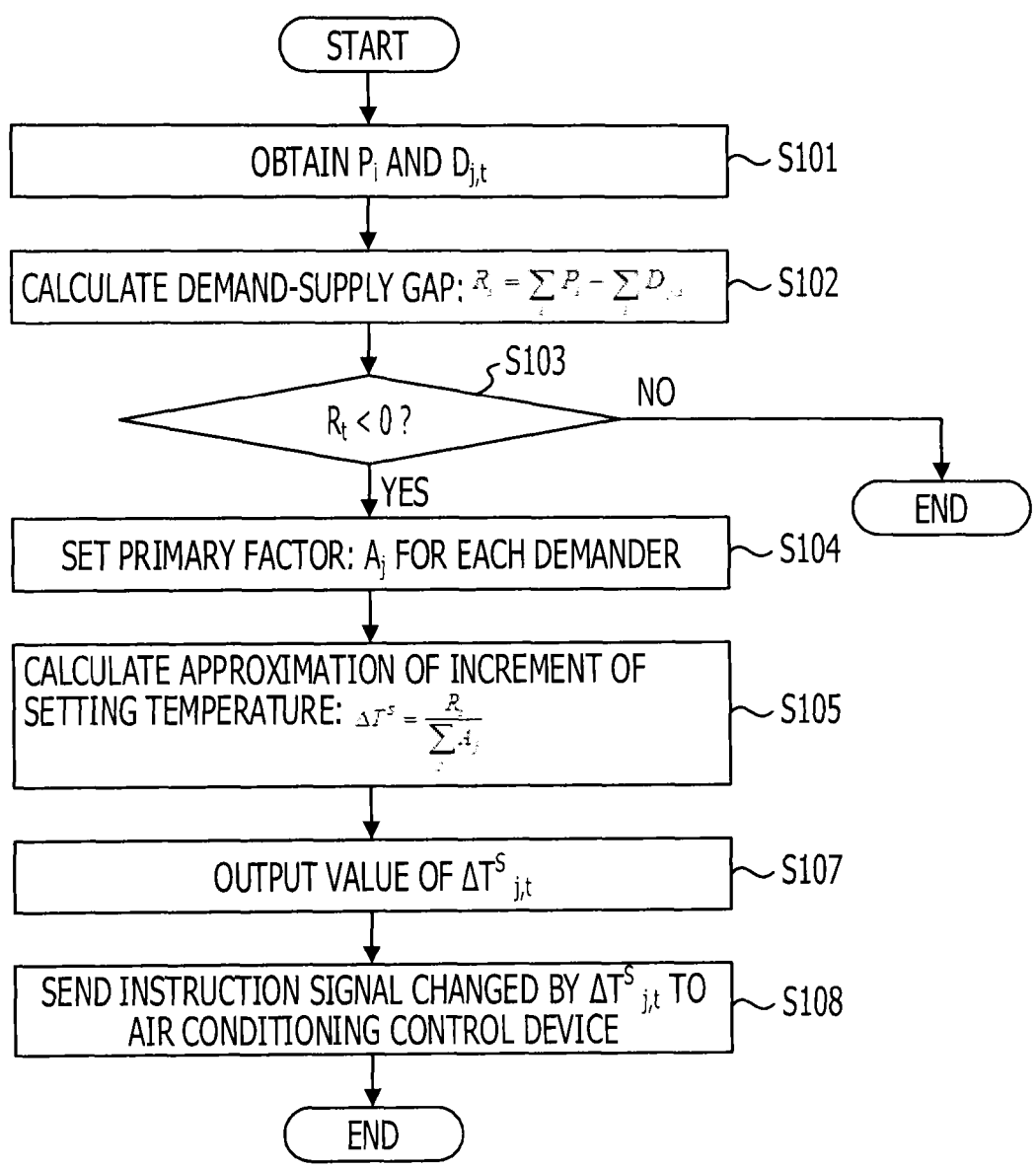
FIG. 4 is a flowchart illustrating one example of an information processing method by the information processing device in the first embodiment.

FIG. 4 is a flowchart illustrating one example of an information processing method by the information processing device 10 in the first embodiment. FIG. 5 is one example of numerical values of various variables used for information processing.

Firstly, background of process to be executed in S101 and S102 is described. It is preferred that the power provider makes a profit as much as possible even in a case of carrying out suppression of a power demand of a demander by DR/DSM. An objective function and constraints to make a control plan of the air conditioning apparatus 70 so as to maximize the profit on the side of the power provider may be expressed by the following expressions (1) and (2), respectively.

$$\left\{ \sum_i p_{i,t} \times CP_i + \sum_m \Delta e_{m,t} \times CD - \sum_m PD \times (D_{m,t} - \Delta e_{m,t}) \right\} \to \min \quad (1)$$

$$\sum_i p_{i,t} = \sum_m (D_{m,t} - \Delta e_{m,t}) \quad (2)$$

$\Delta e_{m,t}$ [kWh]: demand-suppressed power consumption of an air conditioning apparatus m at a time t $p_{i,t}$ [kWh]: power supply of from a power supply unit i at the time t (such as procurement from a power provider and private power generation)

$D_{m,t}$ [kWh]: demand prediction for the next day of the air conditioning apparatus m at the time t $CP_i$ [cost/kWh]: unit cost of electricity for power generation in the power supply unit i CD [cost/kWh]: incentive for demand suppression that is paid from a power provider to a demander PD [price/kWh]: unit price per electricity kWh when a demander purchases electricity from a power provider The first term of the expression (1) denotes the electricity cost for generation of power that is supplied by a power supply unit. The second term of the expression (1) denotes an incentive that is paid from a power provider to a demander that suppresses the demand, which becomes a cost on the side of the power provider. The third term of the expression (1) denotes a gain that is made by the power provider by selling power. $D_{m,t} - \Delta e_{m,t}$ denotes power consumption of the air conditioning apparatus m after the power demand is suppressed. For solving the above optimization problem, it is assumed that lower case characters are variables and upper case characters are constants. The expression (1) is deformed using the expression (2) to develop an expression (3).

$$\left\{ \sum_i p_{i,t} \times (CP_i - CD - PD) + \sum_m D_{m,t} \times CD \right\} \to \min \quad (3)$$

Here, since a power provider generally sets the power rate to become greater than the power generation costs, $CP_i < PD$. For this reason, $(CP_i - CD - PD)$ in the first term becomes a negative value. Therefore, the amount $p_{i,t}$ of power generation for the minimum expression (3) becomes $P_i$, which is the upper limit value. With that, in S101 and S102, using the amount $p_{i,t}$ of power generation=$P_i$, process to calculate a supply shortage $R_t$ is executed.

In S101, firstly, the power information obtaining unit 13 obtains the upper limit value $P_i$ of power supplied in each power supply unit i and a power demand predicted value $D_{j,t}$ of each demander j at the time t from the power data providing device 20. Then, the information on $P_i$ and $D_{j,t}$ thus obtained is stored in the second storage unit 12. The power supply unit i includes, for example, power generating facilities, such as a power generator that belongs to a power provider, or power generating facilities, such as a private power generator. The power data providing device 20 is capable of obtaining a power demand predicted value $D_{j,t}$ for the next day using an existing method utilizing a neural network, for example. Each value of $P_i$ and $D_{j,t}$ illustrated in FIG. 5 is one example of the information that is obtained from the power information obtaining unit 13.

Subsequently, in S102, the determination unit 14 carries out readout of information on $P_i$ and $D_{j,t}$ stored in the second storage unit 12. Then, the determination unit 14 calculates a demand-supply gap $R_t$ by the following expression (4). The demand-supply gap $R_t$ may be calculated by, as expressed in the expression (4), subtracting the sum of the power demand predicted value of each demander from the total (sum) of the upper limit value of power supplied in each power supply unit i, that is, the maximum value of power supply that a power provider is capable of supplying.

$$R_t = \sum_i P_i - \sum_i D_{j,t} \tag{4}$$

Using the numerical values illustrated in FIG. 5, the total of $P_i$ becomes $P_1+P_2=15+5=20$ [kWh]. Thus, the demand-supply gap $R_t$ is calculated as $R_t=20-21.2=-1.2$ [kWh]. The left side of the expression (3) is calculated using the numerical values illustrated in FIG. 5 as −176 [yen/h]. Therefore, 176 [yen/h] without the negative sign is the maximum value of profit for the power provider.

Subsequently, in S103, the determination unit 14 determines whether or not the maximum power supply that a power provider is capable of supplying falls below the sum of the power demand predicted value of each demander, that is, whether or not $R_t<0$. In a case of $R_t<0$ (yes in S103), the power demand of the demanders surpasses the maximum power supply by $R_t$. Therefore, it is determined that suppression of the power demand is desired to move on to S103. In contrast, in a case of $R_t>0$ (no in S103), the power demand of the demanders is less than the maximum power supply by $R_t$. Therefore, it is determined that suppression of the power demand is not desired to terminate the information process. In a case of $R_t=-1.2$ [kWh], $-1.2<0$ so that S103 is determined as yes to move on to S104.

In S104 and after, in order to suppress the power demand, process to make a plan of demand suppression by DR/DSM is executed. As described above, in order to carry out the suppression of power consumption evenly with a plurality of apparatuses, it is preferred that variation (dispersion) in the change width of the setting variables among the apparatuses is as less as possible. With that, in order to make a control plan of the air conditioning apparatus 70 in such a manner that the dispersion of the setting temperatures approaches the minimum value, objective functions expressed in expressions (5) and (6) are set.

$$\left\{ \sum_j (\Delta T_{j,t}^S - \mu_t)^2 \right\} \to \min \tag{5}$$

$$\mu_t = \frac{1}{n} \cdot \sum_{j=1}^n \Delta T_{j,t}^S \tag{6}$$

Here, n denotes a total number of the air conditioning apparatuses 70. In contrast, in a case that an amount of power demand suppression that is obtained by that each demander changes the setting temperature becomes equal to the demand-supply gap $R_t$, $R_t$ may be expressed by a linear model using the primary factor $A_j$ $$R_t = \sum_j A_j \Delta T_{j,t}^S \tag{7}$$

The expression (7) is an expression that expresses a constraint to compensate the demand-supply gap. The expression (7) is the constraint that is used for calculating the optimal solution for $\Delta T_{j,t}^S$ from the expressions (5) and (6). The primary factor $A_j$ in the expression (7) is a factor different for each demander j. The primary factor $A_j$ is a factor to be in a dimension of Wh (watt-hour) by multiplying an increase $\Delta T_{j,t}^S$ of the setting temperature.

Figure 6:
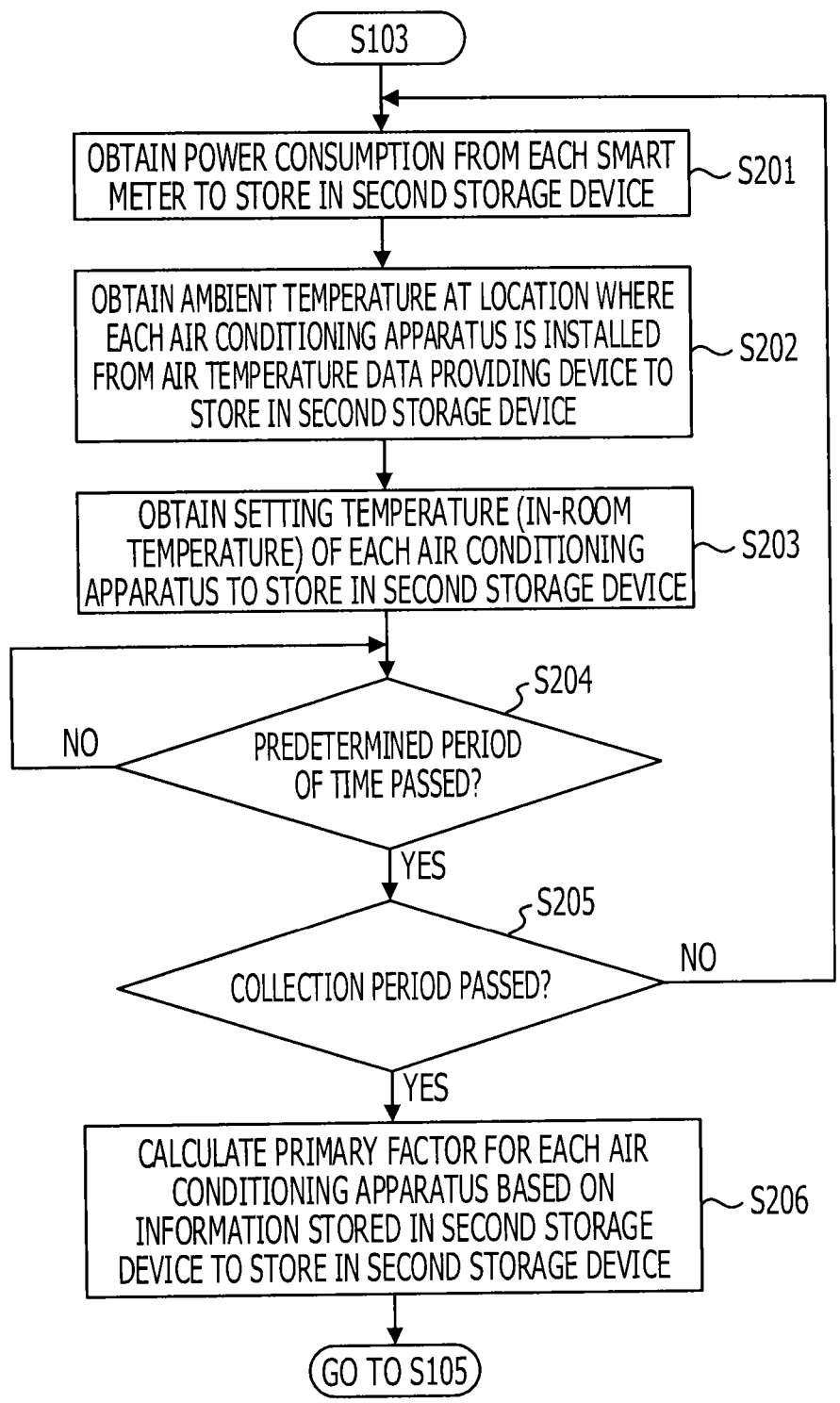
FIG. 6 is a flowchart illustrating a method of calculating a primary factor $A_j$.

A method of calculating the primary factor $A_j$ is described below. FIG. 6 is a flowchart illustrating a method of calculating the primary factor $A_j$.

Firstly, the power information obtaining unit 13 obtains information on power consumption data of the air conditioning apparatus 70 and a time of day (time and date) when obtained from each smart meter 60. Then, the power information obtaining unit 13 stores the obtained information in the obtained information database in the second storage unit 12 (S201). The information described above is assumed to be obtained from an air conditioning apparatus in operation among the air conditioning apparatuses 70 that are capable of controlling power from the information processing device 10. The conditioning apparatus in operation is an air conditioning apparatus that is capable of obtaining information through the smart meter 60. Such air conditioning apparatus in operation also includes an air conditioning apparatus having a power source turned off while being capable of obtaining information.

Subsequently, the temperature information obtaining unit 15 obtains information on an ambient temperature $T_{out}$ at a location where each air conditioning apparatus 70 is installed and a time of day (time and date) when obtained from the air temperature data providing device 30. Then, the temperature information obtaining unit 15 stores the obtained information in the obtained information database in the second storage unit 12 (S202).

Subsequently, the temperature information obtaining unit 15 obtains information on a setting temperature, that is, an in-room temperature $T_{in}$ of each air conditioning apparatus 70 and a time of day (time and date) when obtained from the air conditioning control device 50. Then, the temperature information obtaining unit 15 stores the information on the setting temperature thus obtained in the obtained information database in the second storage unit 12 (S203).

FIG. 7 is a diagram illustrating one example of the obtained information database used for calculating the primary factor $A_j$. As illustrated in FIG. 7, in the second storage unit 12, the information on the setting temperature $T_{in}$, the information on the ambient temperature $T_{out}$, and the information on power consumption E are stored in a state of being associated with each other for each time and date when the information is obtained.

Going back to FIG. 6, in S204, the power information obtaining unit 13 and the temperature information obtaining unit 15 determine whether or not a predetermined period of time has passed. Here, the predetermined period of time is an interval to obtain each type of data that is preset (for example, one hour). In a case that it is determined that the predetermined period of time has not passed (no in S204), S204 is repeated again. In contrast, in a case that it is determined that the predetermined period of time has passed (yes in S204), it moves on to S205.

In S205, the factor calculation unit 16 determines whether or not a collection time has passed. Here, the collection time is a collection period of information to calculate the primary factor (for example, one week). In a case that it is determined that the collection time has not passed (no in S205), the process in S201 and after is executed again going back to S201 and information is continued to be accumulated in obtained information database illustrated in FIG. 7. In contrast, in a case that it is determined that the collection time has passed (yes in S205), it moves on to S206.

In S206, the factor calculation unit 16 calculates primary factors $A_j$, $B_j$, and $C_j$ for each air conditioning apparatus 70 in the expression (8) based on the information in the obtained information database. Here, the expression (8) is a linear model that is expressed with the ambient temperature $T_{out}$ and the setting temperature $T_{in}$ as explanatory variables and with power consumption $E_{j,Tout,Tin}$ of the air conditioning apparatus 70 of the demander j as an explained variable.

$$E_{j,Tout,Tin} = A_j \times T_{out} + B_j \times T_{in} + C_j \tag{8}$$

In the present embodiment, focusing on that there is strong correlation between the ambient temperature $T_{out}$ and the power consumption $E_{j,Tout,Tin}$ of the air conditioning apparatus 70, the linear expression expressed in the expression (8) is used. The factor calculation unit 16 calculates the primary factors $A_j$, $B_j$, and $C_j$ by multiple regression analysis using the information on the obtained information database obtained by repeating S201 through S203. Then, the information on the primary factors $A_j$, $B_j$, and $C_j$ thus calculated is stored in the second storage unit 12 as factor information database.

FIG. 8 is a diagram illustrating one example of the factor information database. As illustrated in FIG. 8, in the second storage unit 12, the information on the primary factors $A_j$, $B_j$, and $C_j$ thus calculated is stored in a state of being associated with each other for each identification (ID) given to each air conditioning apparatus 70.

In such a manner, the reason why the primary factors $A_j$, $B_j$, and $C_j$ of each air conditioning apparatus 70 determined from the expression (8) are calculated is because the power consumption of the air conditioning apparatus is different depending on the performance (such as a cooling capacity) of the conditioning apparatus and the area (or volume) of a room in which the air conditioning apparatus is installed. For example, an air conditioning apparatus having a low cooling capacity (or a heating capacity) has greater power consumption than an air conditioning apparatus having a high cooling capacity (or a heating capacity). Therefore, the $A_j$ value of the air conditioning apparatus having a low cooling capacity (or a heating capacity) is greater than the $A_j$ value of the air conditioning apparatus having a high cooling capacity (or a heating capacity). Even with an identical air conditioning apparatus, an air conditioning apparatus installed in a room having a greater area has greater power consumption than the air conditioning apparatus installed in a room having a smaller area. Therefore, the air conditioning apparatus installed in a room having a greater area has a greater $A_j$ value than the air conditioning apparatus installed in a room having a smaller area.

The process goes back again to FIG. 4. The objective functions expressed in the expressions (5) and (6) may have $\Delta T^S_{j,t}$ to be expressed by a real value $\Delta T^S$ in a case that the integer condition is removed from $\Delta T^S_{j,t}$ to allow a real value. With that, in S105, the real value $\Delta T^S$ is calculated. The real value $\Delta T^S$ of the change width in setting temperatures is a common real value that does not depend on each apparatus. Since $\Delta T^S$ is a constant as $\Delta T^S$ is substituted for $\Delta T^S_{j,t}$ in the expression (5) for deformation, $\Delta T^S$ may be calculated by an expression (9)

$$\Delta T^S = \frac{R_t}{\sum_j A_j} \tag{9}$$

using a method of undetermined coefficient.

FIG. 9 is a diagram illustrating one example of numerical values of the primary factor $A_j$ that is calculated by the factor calculation unit 16. In a case of $R_t = -1.2$ [kWh], as $\Delta T^S$ is calculated using the numerical values illustrated in FIG. 8, calculation is done as $\Delta T^S = -1.2/(-0.09 - 0.11 - 0.08 - 0.12 - 0.07 - 0.13 - 0.1 - 0.1 - 0.1 - 0.1) = 1.2$ [° C.]. That is, by raising the setting temperature of each air conditioning apparatus by $\Delta T^S = 1.2$ [° C.], it is enabled to reduce the power consumption of each apparatus so as to approach the demand-supply gap $R_t$.

The primary factor $A_j$ is a value depending on the performance of each air conditioning apparatus or a space to be installed as already described. Thus, by calculating the real value $\Delta T^S$ using this primary factor $A_j$, the change width in setting temperatures considering the performance of each air conditioning apparatus and the space to be installed may be calculated. Each value of the primary factors $A_j$, $B_j$ and $C_j$ thus calculated is substituted into the expression (8) and the value of the real value $\Delta T^S$ thus calculated is substituted for $T_{in}$, thereby also allowing the calculation of the amount of suppression ins power consumption for each air conditioning apparatus.

Subsequently, the output unit 18 outputs the value of the change width $\Delta T^S_{j,t}$ in setting temperatures of each demander that is calculated in S105 (S107). The output unit 18 is also capable of outputting, in addition to the value of the change width $\Delta T^S_{j,t}$, together with other parameters, such as the amount of power generation $p_{i,t} = P_i$, for example.

Subsequently, the control execution unit 19 sends an instruction signal to change the setting temperature of the air conditioning apparatus 70 of each demander using the change width $\Delta T^S_{j,t}$ that is calculated by the setting temperature calculation unit 17 to the air conditioning control device 50 of each demander via the network 40 (S108).

As just described, the information processing by the information processing device 10 may be carried out.

In such a manner, according to the first embodiment, the primary factor $A_j$ that depends on the performance of each air conditioning apparatus or the space to be installed is calculated based on the information on the power consumption of each air conditioning apparatus, and the change width in setting temperatures of each air conditioning apparatus is calculated as a real value based on the primary factor $A_j$.

According to this method, while maintaining the maximum profit for the power provider, it is capable of suppressing the variation in the change width in setting temperatures among the air conditioning apparatuses. In the first embodiment, the change width in the setting variables dealing with the shortage of power to be supplied to a plurality apparatuses is calculated as a real value, so that it is enabled to approximately remove the dispersion of the change width.

Further, the embodiment of the present disclosure is applied to each of the air conditioning apparatuses that are installed in rooms of a plurality of demanders, thereby approximately removing the difference between the change widths in setting temperatures of the air conditioning apparatuses among each of the demanders. Therefore, it is enabled to suppress that a specific demander feels a sense of unfairness for the variation in the change width in setting temperatures.

Second Embodiment

Specific descriptions are given below to a second embodiment with reference to FIGS. 10 and 11.

In the second embodiment, a setting method in a case that the change width in setting temperatures of each air conditioning apparatus is not a real value but an integer value is described. The configurations of the information processing system and the information processing device in the second embodiment are approximately identical to the configurations described in the first embodiment, so that a reference character identical to the first embodiment is given to each component to omit the descriptions.

Figure 10:
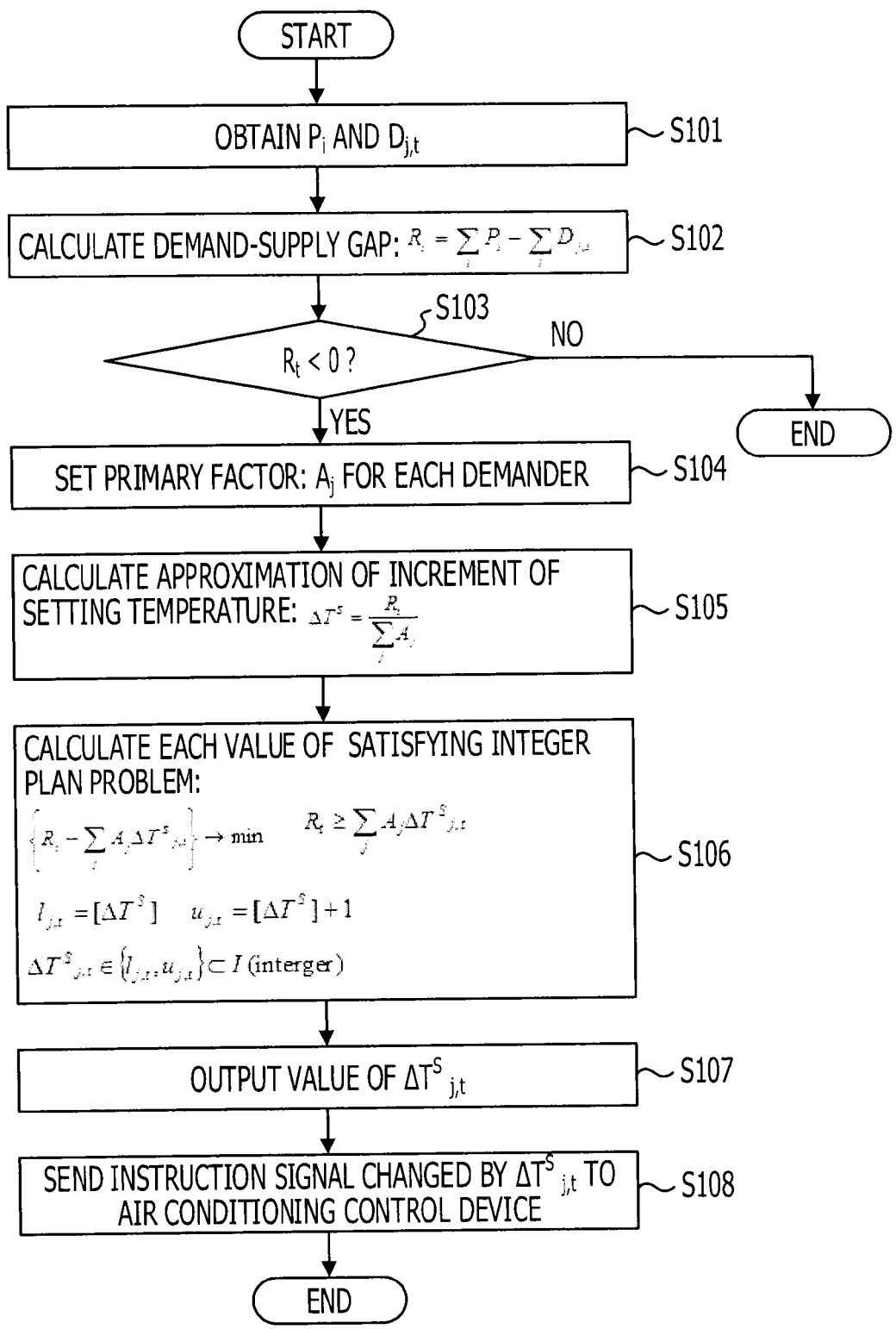
FIG. 10 is a flowchart illustrating one example of an information processing method by an information processing device in a second embodiment.

FIG. 10 is a flowchart illustrating one example of an information processing method by the information processing device 10 in the second embodiment. The process from S101 to S105 is approximately identical to the first embodiment, and thus the descriptions are omitted.

In S106, the setting temperature calculation unit 17 calculates each value of change width $\Delta T^S_{j,t}$ in setting temperatures of each demander in such a manner that a demand-supply gap $R_t$ approaches the minimum value by reset of a setting temperature by each demander. Specifically, the setting temperature calculation unit 17 calculates each value of $\Delta T^S_{j,t}$ in such a manner that a difference between the demand-supply gap $R_t$ and the amount of reduction in the power demand that is obtained by resetting the setting temperature of each demander, equivalent to the right side of the expression (7), approaches the minimum value. Each value of $\Delta T^S_{j,t}$ may be calculated by solving an objective function expressed in the following expression (10) using the real value $\Delta T^S$ of the setting temperature that is calculated by the expression (9).

$$\left\{ R_t - \sum_j A_j \Delta T^S_{j,t} \right\} \to \min \quad (10)$$

$$R_t \geq \sum_j A_j \Delta T^S_{j,t} \quad (11)$$

$$l_{j,t} = [\Delta T^S] \quad (12)$$

$$u_{j,t} = [\Delta T^S] + 1 \quad (13)$$

$$\Delta T^S_{j,t} \in \{l_{j,t}, u_{j,t}\} \subset I(\text{interger}) \quad (14)$$

Here, both the left side and the right side of the expression (11) become negative values. The expression (11) is a constraint expressing that the power consumption saved by resetting the setting temperature by each demander is more than the shortage (demand-supply gap) of power supply in a case of not being reset. By setting the constraint in the expression (11), the demand-supply gap $R_t$ may be minimized on the side having some extra power supply.

In the expression (12), $l_{j,t}$ denotes a first temperature that is expressed by a maximum integer not exceeding the real value of $\Delta T^S$. In the expression (13), $u_{j,t}$ denotes a second temperature that is obtained by adding a unit temperature (1° C. in the second embodiment) to the first temperature. The expressions (12) and (13) are the constraints to restrict each value of $\Delta T^S_{j,t}$ to integer values before and after the real value $\Delta T^S$, which is a real number. The [ ] in the expressions is a gauss symbol.

The expression (14) is a constraint to express that each value of $\Delta T^S_{j,t}$ becomes an integer value of either $l_{j,t}$ or $u_{j,t}$ that is calculated by the expressions (12) and (13).

As just described, by setting the constraints of the expressions (12), (13), and (14), it is enabled to set the change width in such a manner that the variation in the change width in setting temperatures of each air conditioning apparatus 70 becomes a unit temperature (1° C. in the second embodiment), which is a control unit that allows each air conditioning apparatus 70 set a temperature. Since a plan problem may be solved by restricting the search range to the vicinity of the real value, it is also enabled to accelerate the process.

FIG. 11 is a diagram illustrating one example of numerical values of the change width $\Delta T^S_{j,t}$ in setting temperatures of each demander that is calculated by the setting temperature calculation unit 17 in the second embodiment. In a case of $R_t=-1.2$ [kWh] and $\Delta T^S=1.2$[° C.], then $l_{j,t}=1$[° C.] and $u_{j,t}=2$[° C.] from the expressions (11) and (12). Thus, by calculating the solution of the objective function expressed in the expression (10) using a solver of an integer plan method, for example, each value of $\Delta T^S_{j,t}$ illustrated in FIG. 11 may be calculated. Since the process in S107 and after is approximately similar to the first embodiment, the descriptions are omitted.

As described above, the information processing by the information processing device 10 may be carried out.

In such a manner according to the second embodiment, an integer value of the change width in setting temperatures is calculated for each apparatus based on the real value of the change width in setting temperatures. This enables to make a control plan for each apparatus in such a manner that the dispersion of the change width in the setting variables for the setting temperature dealing with the shortage of power to be supplied to each air conditioning apparatus approaches the minimum even in an air conditioning apparatus that is not capable of setting the setting temperature as a real value.

Modification

Descriptions are given below to a modification of the second embodiment.

In the second embodiment, a setting method in a case that the change width in setting temperatures of each air conditioning apparatus is not a real value but an integer value has been described. In contrast, in a case that the control unit that allows each air conditioning apparatus to set a temperature is in a real value, it may also be a discrete value, instead of the integer value, of the real value. For example, while the change width in setting temperatures is a unit temperature in the second embodiment, in a case that the setting temperature of each air conditioning apparatus may be set in a change width w not more than the unit temperature, an expression (15) instead of the expression (12) and an expression (16) instead of the expression (13) may be used, respectively.

$$l_{j,t} = \left[\frac{\Delta T^S}{w}\right] \times w \quad (15)$$

$$u_{j,t} = \left(\left[\frac{\Delta T^S}{w}\right] + 1\right) \times w \quad (16)$$

As one example, a case of $T^S=1.2[°\text{ C.}]$ and the setting temperature of each air conditioning apparatus possible to set at 0.5° C. intervals is described. In this case, since w=0.5, calculation is made as $l_{j,t}=1.0[°\text{ C.}]$ and $u_{j,t}=1.5[°\text{ C.}]$ from the expression (15). Then, similar to the second embodiment, the solution of the objective function expressed in the expression (10) is calculated using a solver of an integer plan method, for example.

According to this method, the change width in setting temperatures of each air conditioning apparatus may be set in higher precision, so that it is enabled that the dispersion of the change width in setting temperatures of each air conditioning apparatus approaches the minimum even more.

Although preferred embodiments are described in detail, embodiments of the present disclosure are not limited to any specific embodiment and a variety of deformation and modifications are possible. For example, in the first embodiment and the second embodiment, the apparatus subject to power consumption control is described as an air conditioning apparatus although embodiments of the present disclosure is also applicable to an apparatus other than an air conditioning apparatus.

For example, when the apparatus is a personal computer (PC), the setting variables may be the length or interval of time to switch the operation mode of the PC from a normal mode to a standby mode and the like. When the apparatus is a lighting fixture, the setting variables may be the length or interval of time to lower the luminance or to temporarily turn off the lighting and the like. In a case of applying an embodiment of the present disclosure to an apparatus other than an air conditioning apparatus, a factor proportional to the power consumption of each apparatus, for example, may be calculated to be used as the primary factor $A_j$. In a case of applying an embodiment of the present disclosure to an apparatus other than an air conditioning apparatus, the control of setting variables for each apparatus is taken care by a control device, such as a control circuit.

For example, although the output unit 18 and the control execution unit 19 are illustrated in FIG. 3, either configuration may also be omitted. Although the process in S104 is carried out after carrying out the process in S103 in FIG. 4, the process in S104 may be carried out in any step as long as it is before the process in S105. For example, the process in S104 may also be carried out before or after the process in S101.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing device comprising:
    a memory; and
    a processor coupled to the memory and configured to
        obtain data including a temperature in a space where each of a plurality of air conditioning apparatuses is installed, a temperature outside the space, and power consumption of the plurality of air conditioning apparatuses;
        calculate a factor to obtain relationship between the temperature in the space, the temperature outside the space, and the power consumption related to each of the plurality of the air conditioning apparatuses based on the obtained data; and
        calculate, in a case of changing a setting temperature of the plurality of air conditioning apparatuses, a change width of each of the setting temperatures of the plurality of air conditioning apparatuses in such a manner that variation in the change width becomes a control unit using an objective function expressing a cost of a power supplier and the calculated factor, wherein
    the processor is configured to calculate the change width in a manner that dispersion of the change width approaches a minimum.

2. The information processing device according to claim 1, wherein the processor is configured to:
    obtain information on an upper limit amount of a total of power to be supplied to the plurality of air conditioning apparatuses and information on a predicted demand for power to be consumed by the plurality of air conditioning apparatuses; and
    calculate a first real value of the change width in the setting temperature based on a difference between the information on the upper limit amount of the total of the power and the information on the predicted demand for the power.

3. The information processing device according to claim 1, wherein the plurality of air conditioning apparatuses are installed in rooms of a plurality of demanders.

4. The information processing device according to claim 2, wherein the processor is configured to:
    obtain a temperature of each of respective rooms where the plurality of air conditioning apparatuses are installed and a temperature outside the respective rooms;
    calculate a primary factor according to the temperature outside the room when the power consumption of each of the plurality of air conditioning apparatuses is expressed as a linear model using the temperature outside the rooms for each of the plurality of air conditioning apparatuses; and
    calculate the first real value of the change width in the setting temperature based on the primary factor.

5. The information processing device according to claim 2, wherein the processor is configured to calculate the change width in the setting temperature for each of the air conditioning apparatuses based on the first real value of the change width in the setting temperature.

6. The information processing device according to claim 5, wherein the processor is configured to calculate an integer value of the change width in the setting temperature for each of the air conditioning apparatuses based on the first real value, the integer value of the change width in the setting temperature being a first temperature expressed by a maximum integer not exceeding an approximation or a second temperature obtained by adding a unit temperature to the first temperature.

7. The information processing device according to claim 5, wherein the processor is configured to calculate a second real value of the change width in the setting temperature for each of the air conditioning apparatuses, the second real value being a value of a maximum first temperature not exceeding an approximation or a value of a second temperature obtained by adding a temperature width less than 1 to the first temperature.

8. An information processing method executed by a computer, the information processing method comprising:
    obtaining data including a temperature in a space where each of a plurality of air conditioning apparatuses is installed, a temperature outside the space, and power consumption of the plurality of air conditioning apparatuses;
    calculating a factor to obtain relationship between the temperature in the space, the temperature outside the space, and the power consumption related to each of the plurality of air conditioning apparatuses based on the obtained data;
    calculating, in a case of changing a setting temperature of the plurality of air conditioning apparatuses, a change width of each of the setting temperatures of the plurality of air conditioning apparatuses in such a manner that variation in the change width becomes a control unit using the calculated factor of each of the air conditioning apparatuses, and
    controlling the setting temperature of the plurality of air conditioning apparatuses based on the change width, wherein
    the calculating of the change width includes calculating the change width in a manner that dispersion of the change width approaches a minimum.

9. The information processing method according to claim 8, wherein the calculating of the change width includes:
    obtaining information on an upper limit amount of a total of power to be supplied to the plurality of air conditioning apparatuses and information on a predicted demand for power to be consumed by the plurality of air conditioning apparatuses; and
    calculating a first real value of the change width in the setting temperature based on a difference between the information on the upper limit amount of the total of the power and the information on the predicted demand for the power.

10. The information processing method according to claim 8, wherein the plurality of air conditioning apparatuses are installed in rooms of a plurality of demanders.

11. The information processing method according to claim 9, wherein
    the obtaining includes obtaining a temperature of each of respective rooms where the plurality of air conditioning apparatuses are installed and a temperature outside the respective rooms, and
    the calculating of the first real value includes
        calculating a primary factor according to the temperature outside the room when the power consumption of each of the plurality of air conditioning apparatuses is expressed as a linear model using the temperature outside the rooms for each of the plurality of air conditioning apparatuses; and
        calculating the first real value of the change width in the setting temperature based on the primary factor.

12. The information processing method according to claim 9, wherein the calculating of the change width includes calculating the change width in the setting temperature for each of the air conditioning apparatuses based on the first real value of the change width in the setting temperature.

13. The information processing method according to claim 12, wherein the calculating of the change width includes calculating an integer value of the change width in the setting temperature for each of the air conditioning apparatuses based on the first real value, the integer value of the change width in the setting temperature being a first temperature expressed by a maximum integer not exceeding an approximation or a second temperature obtained by adding a unit temperature to the first temperature.

14. The information processing method according to claim 12, wherein the calculating of the change width includes calculating a second real value of the change width in the setting temperature for each of the air conditioning apparatuses, the second real value being a value of a maximum first temperature not exceeding an approximation or a value of a second temperature obtained by adding a temperature width less than 1 to the first temperature.

15. A non-transitory computer-readable recording medium storing a program that causes a computer to execute a process, the process comprising:
    obtaining data including a temperature in a space where each of a plurality of air conditioning apparatuses are installed, a temperature outside the space, and power consumption of the plurality of air conditioning apparatuses;
    calculating a factor to obtain relationship between the temperature in the space, the temperature outside the space, and the power consumption related to each of the plurality of air conditioning apparatuses based on the obtained data;
    calculating, in a case of changing a setting temperature of the plurality of air conditioning apparatuses, a change width of each of the setting temperatures of the plurality of air conditioning apparatuses in such a manner that variation in the change width becomes a control unit using the calculated factor of each of the air conditioning apparatuses, and
    controlling the setting temperature of the plurality of air conditioning apparatuses based on the change width, wherein
    the calculating of the change width includes calculating the change width in a manner that dispersion of the change width approaches a minimum.

16. The non-transitory computer-readable recording medium according to claim 15, wherein the calculating of the change width includes:
    obtaining information on an upper limit amount of a total of power to be supplied to the plurality of air conditioning apparatuses and information on a predicted demand for power to be consumed by the plurality of air conditioning apparatuses; and
    calculating a first real value of the change width in the setting temperature based on a difference between the information on the upper limit amount of the total of the power and the information on the predicted demand for the power.

17. The non-transitory computer-readable recording medium according to claim 15, wherein the plurality of air conditioning apparatuses are installed in rooms of a plurality of demanders.

18. The non-transitory computer-readable recording medium according to claim 16, wherein
> the obtaining includes obtaining a temperature of each of respective rooms where the plurality of air conditioning apparatuses are installed and a temperature outside the respective rooms, and
> the calculating of the first real value includes
>> calculating a primary factor according to the temperature outside the room when the power consumption of each of the plurality of air conditioning apparatuses is expressed as a linear model using the temperature outside the rooms for each of the plurality of air conditioning apparatuses; and
>> calculating the first real value of the change width in the setting temperature based on the primary factor.

19. The non-transitory computer-readable recording medium according to claim 16, wherein the calculating of the change width includes calculating the change width in the setting temperature for each of the air conditioning apparatuses based on the first real value of the change width in the setting temperature.

\* \* \* \* \*